United States Patent [19]

Moore

[11] Patent Number: 5,444,972
[45] Date of Patent: Aug. 29, 1995

[54] SOLAR-GAS COMBINED CYCLE ELECTRICAL GENERATING SYSTEM

[75] Inventor: Roger M. Moore, Newbury Park, Calif.

[73] Assignee: Rockwell International Corporation, Seal Beach, Calif.

[21] Appl. No.: 226,744

[22] Filed: Apr. 12, 1994

[51] Int. Cl.$^6$ .............................................. F02C 6/18
[52] U.S. Cl. ............................ 60/39.182; 60/39.33; 60/641.8; 60/698
[58] Field of Search ............... 60/39.182, 39.33, 641.8, 60/641.11, 641.12, 641.13, 641.14, 641.15, 698

[56] References Cited

U.S. PATENT DOCUMENTS

| | | | |
|---|---|---|---|
| 4,167,856 | 9/1979 | Seidel et al. | 60/39.33 |
| 4,189,922 | 2/1980 | Bellofatto | 60/641.8 |
| 4,509,333 | 4/1985 | Nussdorfer et al. | 60/641.14 |
| 4,942,736 | 7/1990 | Bronicki | 60/641.12 |

FOREIGN PATENT DOCUMENTS 2410741  8/1979  France ................................. 60/698

OTHER PUBLICATIONS

Solar Central Receiver Technology Advancement for Electric Utility Applications, PG&E Research and Development Report Dec. 17, 1992.
Arizona Public Service Utility Solar Central Receiver Study, Nov. 1988.
Solar Central Receiver Hybrid—A Cost Effective Future Power Alternative D. G. Beshore, C. N. Bolton, and J. E. Montague, AIAA 80–0841R, Journal of Energ Jan.-Feb.-1981 p. 51.
Solar-Gas Combined Cycle Power Plant, Roger Moore 55th American Power Conference vol. 55–1 pp. 573–577 Apr. 14, 1993.

*Primary Examiner*—Louis J. Casaregola
*Attorney, Agent, or Firm*—George A. Montanye; Harry B. Field; Steven E. Kahm

[57] ABSTRACT

A design of a power plant which uses hydrocarbon fuels in conjunction with solar power to produce electricity. The power plant consists of an array of heliostats for concentrating sunlight on a central solar receiver. The heat energy thus gathered is used to create steam which runs a steam turbine. Steam to run the steam turbine can alternately or modularly be obtained from the exhaust gas of a turbo-burner and fuel added to a furnace. The solar energy gathered may be stored as hot fluid in a thermal storage tank or used immediately in the power plant. A thermal shield may be employed over the solar central receiver to insulate the solar central receiver, provide leak and fire protection and shield the solar central receiver from solar radiation.

5 Claims, 2 Drawing Sheets

SOLAR-GAS COMBINED CYCLE ELECTRICAL GENERATING SYSTEM

BACKGROUND OF THE INVENTION

1. Field of the Invention

This invention relates to a solar-hydrocarbon fueled combined cycle power generating plant.

2. Description of the Related Art

The basic concept for this invention was presented in a paper entitled "Solar Central Receiver Hybrid—A Cost Effective Future Power Alternative", published in Journal of Energy, Volume 1, Number 1, January–February 1981. A Solar Central Receiver (SCR) hybrid plant conceptual design was provided utilizing molten salt (60% NaNO3, 40% KNO3 by weight) as a heat transfer and thermal storage medium. Solar energy is utilized with fossil fuels (coal, oil or gas) in various plant configurations. The hybrid plant described in the paper was developed for the Arizona Public Service utility by Martin Marietta Aerospace under a U.S. Department of Energy contract.

The hybrid system flow diagram is presented in the reference paper and includes standard powered plant features such as feedwater heaters, steam generator equipment, a steam turbine-generator, pumps, a solar central receiver, solar collectors, a fossil fueled salt heater, and both cold and hot storage tanks. The system can be operated from solar alone, solar plus storage, storage alone, fossil-fired alone, fossil-fired plus storage, or fossil-fired plus solar. In November 1988 additional studies were published in "Arizona Public Service Utility Solar Central Receiver Study", Report No. DOE/AL/38741-1, Volume 1—Phase 1 Topical Report. The application of a gas turbine waste heat recovery system is included in this latter report.

The power generation stations in these publications utilize relatively large thermal storage systems. These papers do not discuss thermal transient controls which reduce the size and cost of thermal storage systems. The Gas Turbine—Waste Heat to Salt Heater in the Arizona Public Service Utility Solar Central Receiver Study, does not recover the salt heater exhaust energy nor utilize a turbine afterburner configuration. Thermal shielding of the solar central receiver (SCR) to minimize startup times and provide a more efficient transition from solar to fossil operation is not discussed. The designs presented are for molten salt only and do not include provisions for sodium as an optional primary heat transport medium.

SUMMARY OF THE INVENTION

The invention is a power generation system consisting of one or more gas turbo-burners with electrical generator(s), a primary heat transport system, a primary furnace, one or more steam generators, a steam turbine-generator, heliostats, a solar central receiver (SCR), an SCR thermal shield, and a thermal transient control system. The turbo-burners provide additional operational abilities to rapidly offset cloud cover transients at high fossil fuel to electrical conversion efficiencies. The thermal transient control system provides added protection for system components due to thermal transients while maintaining power production. The moveable SCR thermal shield provides a smooth and efficient transition during shutdown and startup of the solar central receiver with minimal heat loss. It also encapsulates the SCR should a primary fluid leak occur.

OBJECTS OF THE INVENTION

It is an object of the invention to provide a method of electrical energy production over a 24 hour per day operating period wherein solar energy is utilized to reduce fossil fuel consumption and related environmental emissions.

It is a further object of the invention to utilize turbo-burners to improve overall plant effectiveness by using shaft energy, waste exhaust heat and afterburner fuel to produce electricity.

It is a further object of the invention to reduce energy losses and provide an added degree of safety during off normal occurrences by employing a SCR thermal shield.

Another object of the invention is to minimize the impact of temperature changes within the primary thermal transport loop by using a thermal transient control system.

A still further object of the invention is to recover heat from the furnace exhaust stack to increase the overall plant energy conversion efficiency.

It is also an object of the invention to make it easy to provide maintenance on specific modules within the plant while the balance of the plant continues to produce electricity. The plant can operate 24 hours per day with or without solar input, with or without the turbo-burners, with or without the auxiliary fossil fuel burners, or with or without thermal storage.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
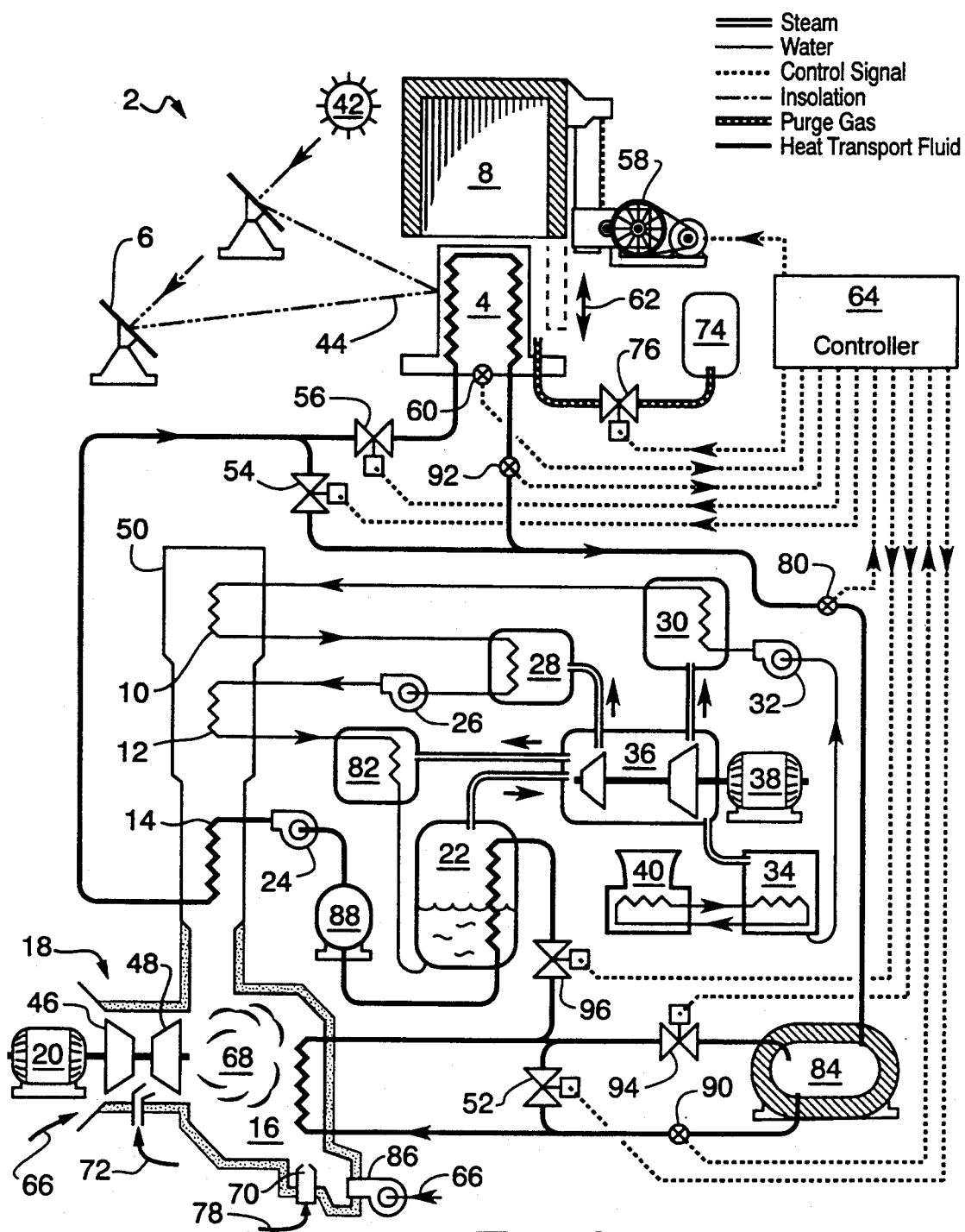
FIG. 1 is a schematic representation of the total system.

This invention provides an efficient means for the production of electricity while utilizing solar energy and fossil fuels. The primary heat transport fluid is utilized by pumping it through piping loops through furnace 16 where heat is obtained from the exhaust of a turbo-burner 18, which is a specialized gas turbine generator. Turbo-burner 18 is a specialized gas turbine that would be utilized to provide both the exhaust gas and combustion in the furnace 16 as opposed to a gas turbine, which may only supply hot exhaust gases to a heat exchanger. Heat can also be added through auxiliary burners 70 in the wall of the furnace 16. The combustion exhaust gases exit through exhaust stack 50. The heat transport fluid moves around the loop into a steam generator 22 and through tubing where the outside tubes' water is heated to produce steam that goes through a steam turbine 36. The turbine shaft rotates from the imparted steam energy and produces electricity from generator 38 connected to the turbine shaft.

The heat transport fluid exits steam generator 22 to the expansion tank 88 into the primary fluid pump 24. The heat transport fluid may bypass through valve 54, or optionally be sent through the solar central receiver (SCR) 4, and flow control valve 56, where concentrated sunlight 44, is imparted from the heliostat 6 and the sun 42. The fluid with its added energy is then transported further around the loop past sensors 92 and 80 and into the thermal storage tank 84. Thermal storage tank 84 acts as a thermal buffer within the system to provide an effective method of accommodating thermal transients and extending the input from the solar energy past the time when the solar rays may subside. The sizing of this tank could be based on the applicable needs of the customer at the time, and it could be minimized with very little capacity, depending on those needs. The primary fluid then exits the thermal storage tank 84 continues around the loop past sensor 90 and back to the furnace 16. The thermal transient control system consists of sensors 80, 90, and 92, which are thermal temperature sensors. These are utilized with valves 96, 52, and 94 to minimize the effects of a cloud cover or off-normal conditions due to the heat input to the solar central receiver 4. A decrease in temperature at sensor 80 can be accommodated by diverting hot primary fluid flow through valve 94 and into the hot storage tank 84, if required. A decrease in temperature at sensor 90 can be accommodated by increasing the thermal effectiveness of auxiliary burner 70 or turbo-burner 18 in furnace 16. The solar central receiver 4 can be taken out of service by opening valve 54 and closing valve 56. This would completely take the solar energy input out of the plant loop upon subsidence of solar ray from sun 42 or defocusing of heliostats 6.

Thermal shield 8 is utilized to encapsulate the solar central receiver 4 with the positioner 58 which is used to lower and raise, in directions 62, the thermal shield 8 as required. Controller 64 functions as the control logic for the thermal transient control system. It processes inputs and provides feedbacks to the various components in the system based on the system temperatures and operation. Electrical energy is produced at generator 20 along the shaft of the turbine compressor assembly 48, 46. The turbo-burners are a modified gas turbine design utilizing natural gas as a fuel entering at 72, mixing with air 66, and providing both shaft output energy and combustion energy 68 in furnace 16. The steam system and feedwater systems consist mainly of conventional power plant components. The steam generator 22 produces steam which exits the steam generator and goes to steam turbine 36, which is connected to generator 38 for further production of electricity through steam energy. Low energy steam then exits the turbine to the condenser 34's protocol and is cooled by cooling tower 40 back to a liquid phase. The condensate pumped by the condensate pump 32 to the condensate preheater 30 and then through the condensate heater 10 in the exhaust stack 50 of furnace 16. Condensate then flows to deaerator 28 onto feedwater pump 26 through feedwater heater 12 and back to the auxiliary feedwater heater 82, where it is then flowed back to the steam generator 22 to complete the loop. The auxiliary feedwater heater 82 is utilized during times of low exhaust temperatures in the stack 50 or when additional feedwater heating is required at lower power levels to maintain the plant operating conditions. Extraction steam is provided as in a conventional power plant to the condensate preheater 30, deaerator 28, and auxiliary feedwater heater 82. Sensor 60 is a leak detection sensor that would be utilized if a leak would occur in SCR 4, and monitor that condition. The thermoshield 8 would then be lowered by a positioner 58 at the command of controller 64. Once closed, purge valve 76 would open and purge gas from purge gas tank 74 would enter the cavity between thermoshield 8 and the solar central receiver 4 to provide an inert atmosphere to minimize fires or oxidation of the fluid within that cavity. Thermoshield 8 would also minimize the loss of primary fluid at higher temperatures, should a leak occur in the solar central receiver 4.

Auxiliary burner 70 and forced draft blower 86 is provided in furnace 16 to provide additional thermal energy should the turbine 46 be out of service or if a thermal transient input is needed before the other portions of the system can respond. Supplementary fuel 78 is provided to the auxiliary burner 70 for combustion in furnace 16.

The turbo-burner 18 concept provides an additional method of providing thermal input, at a rapid response, or to provide additional offset due to the loss or reduction of the solar energy input should that be required during normal operating periods. Utilizing either a molten salt sodium carbonate, potassium carbonate mixture or utilizing pure sodium as the primary heat transport fluid provides an effective means of heat recovery. Heat transport around the system and provides a means for thermal storage within the loop in thermal storage tank 84. This thermal transport system can be operated at low system pressures and high thermal energy transport and is a marked improvement over the requirements for water systems that require high pressure systems and have lower heat retention characteristics.

Portions of the plant can be taken out of service for maintenance or testing while the remainder of the plant remains on line. The solar central receiver 4 can be completely taken out of service by encapsulating it with the thermal shield 8 and opening valve 54, closing valve 56, and allowing primary fluid flow then to bypass the solar central receiver 4 flow entirely. Isolation valves can be provided for work on the piping or component itself. Turbine 46 18 can be taken out of service and the system can be run with solar only input or with input from burner 70 as far as fossil fuel input goes to the system.

Thermal storage tank 84 sizing is optional with this particular design because temperature transients can be accommodated through the thermal transient control system, however, tradeoff studies would be dependent upon particular electrical power generation needs and the amount of available insolation (sun light) for the given application.

Figure 2:
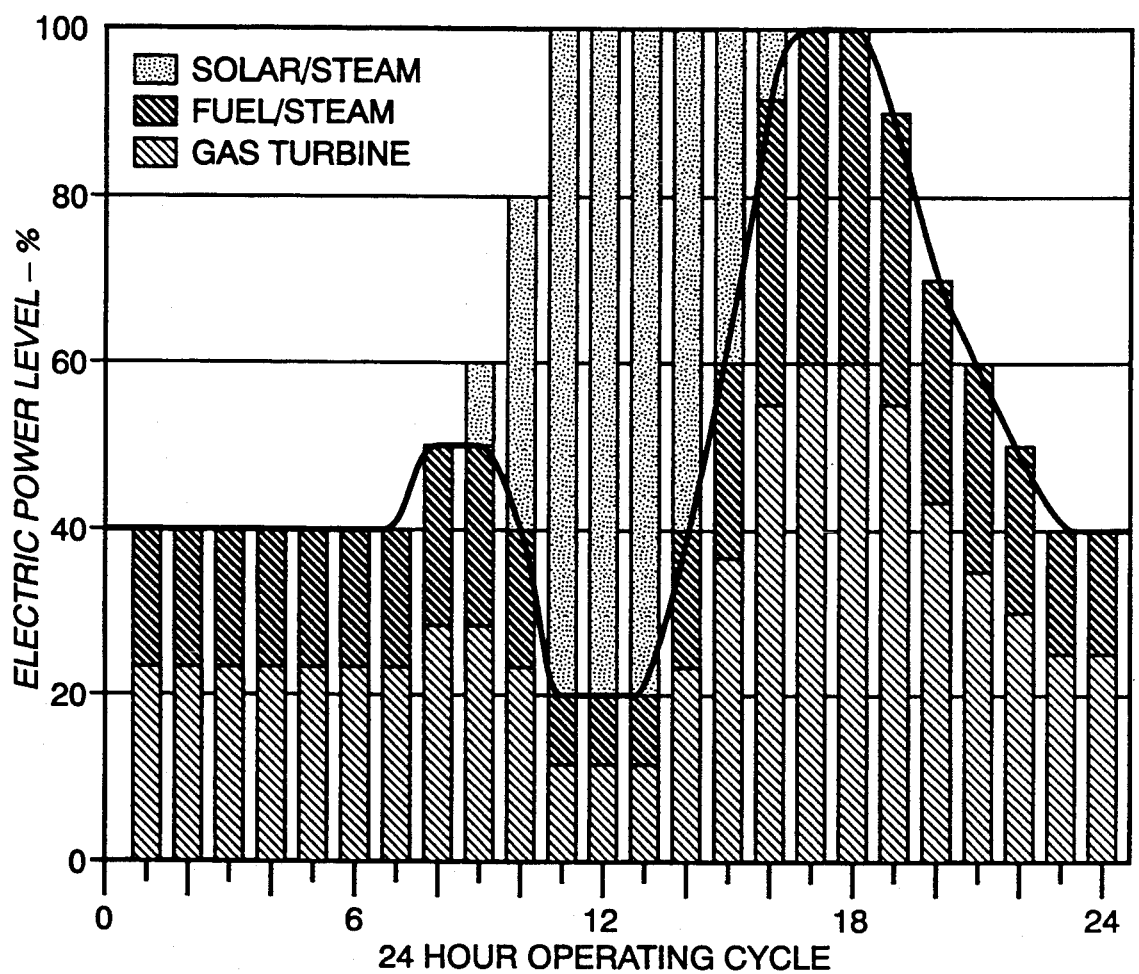
FIG. 2 is a histogram for a 24 hour operating cycle which shows the relative effectiveness of the fossil fuel and solar energy sources.

Conventional fossil fuel power plants operate in the 40–50% fossil fuel energy to electrical power conversion efficiency. This plant was designed to provide the fossil fuel conversion efficiencies approaching 80% or more over a 24-hour operating cycle while the plant remains on line during the entire 24-hour cycle. It can be utilized as base loaded with the peaking being provided by the solar input. It can be operated at an even power production during a 24-hour period with the solar input reducing the fossil fuel consumption during the peak demand periods of the mid-day. A representative operation plan is shown in the histogram in FIG. 2 where a 24-hour operating cycle is provided based upon the peak need for electricity occurring between the hours of 11 a.m. and 6 p.m. The electrical power output for the total plant is shown in the light crosshatched legend as the gas turbine shaft output. The dark crosshatch is the steam turbine shaft output production of electricity that utilizes both the waste heat and combustion in furnace 16. The solar system input from the solar central receiver 4 is shown as the light dotted legend. The total output for the plant is the combined electrical output of the gas turbine electrical generator and the steam turbine, electrical generator. The solid line starting at the 40% power level and occurring across the page is a representative percentage utilization of the fossil fuel energy component with a minimal storage capacity plant. This fossil fuel usage can be further offset by additional storage capacity or by reducing the amount of energy production early in the day or before 6 p.m. after the solar insolation reduces at about 3 p.m. The minimization of the size of the storage tank 84 reduces the capital cost of plant. Tradeoff studies would be indicated that could size this storage based on the available solar insolation of the particular areas where the plant 2 would be sited. The solar central receiver thermal shield 8 is utilized to minimize heat loss during startup hours and shutdown period by encapsulating the solar central receiver 4, for or until the insolation is sufficient to provide an effective increase in the temperature around the loop. This particular plant design can be operated without the turbo-burner system 18, and a variety of fossil fuels can be utilized through furnace 16 and burners 70. If the gas turbo-burner is deleted, then either coal or oil can be utilized as a fossil fuel energy input into furnace 16 by providing combustion 68 and thermal energy into the primary heat transport fluid.

The inventor's paper on the subject matter of this power plant design, titled "Solar-Gas Combined Cycle Power Plant" published in the 55th American Power Conference Vol. 55-1 pages 573-577 on Apr. 14, 1993, is hereby made a part hereof and incorporated herein by reference.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An electric power generation system comprising:
    a gas turbo-burner turbine generator for generation electricity from a combustible fluid,
    the turbo-burner turbine generator having a turbine,
    the turbo-burner turbine generator having hot exhaust gas emitted from the turbine,
    a primary furnace for receiving hot exhaust gas emitted from the gas turbo-burner turbine generator,
    the primary furnace having a heat exchanger for heating a heat transporting fluid from the gas turbo-burner turbine generator exhaust gas,
    the primary furnace having a fuel source for burning fuel to add heat to the heat exchanger and creating more thermal energy,
    a steam generator for generating steam, the steam generator receiving heat from the heat transporting fluid,
    a steam turbine-generator for generating electricity, the steam turbine-generator running on steam from the steam generator,
    a solar central receiver for receiving sunlight,
    a heliostat for concentrating sunlight on the solar central receiver for heating the solar central receiver,
    the solar central receiver having a heat exchanger for transferring heat generated by the sunlight to the heat transport fluid, said heat transport fluid communicating with the steam generator for generation of steam in the steam generator, and selectively communicating with the primary furnace heat exchanger by use of a valve.

2. An electric power generation system as in claim 1 wherein;
    there is a heat shield for placing over the solar collector to reduce the solar radiation striking the solar collector.

3. An electric power generation system as in claim 2 wherein;
    the heat shield has insulation for preventing the solar collector from cooling off.

4. An electric power generation system as in claim 2 wherein;
    there is a means for a fire suppressant system in the heat shield to control and suppress fires, oxidation, and chemical reactions in the solar central receiver.

5. An electric power generation system as in claim 1 wherein;
    a thermal storage tank for storing the hot heat transfer fluid, is connected to the solar central receiver and to the primary furnace,
    the thermal storage tank is also connected to the steam generator such that the stored hot heat transfer fluid supplies heat to the steam generator when solar energy to the solar central receiver or is absent.

* * * * *